(12) United States Patent
Chandrasekharan

(10) Patent No.: US 8,294,114 B2
(45) Date of Patent: Oct. 23, 2012

(54) METHOD FOR MONITORING AN UNKNOWN CONTAINER OR THE CONTENTS IN A VOLUME, MONITORING SYSTEM FOR BEING USED WITH SAID METHOD, AND RADIATION DETECTOR FOR SUCH A MONITORING SYSTEM

(75) Inventor: Rico S. Chandrasekharan, Zürich (CH)

(73) Assignee: ETH Zürich, ETH Transfer, Zürich (CH)

( * ) Notice: Subject to any disclaimer, the term of this patent is extended or adjusted under 35 U.S.C. 154(b) by 911 days.

(21) Appl. No.: 12/297,813

(22) PCT Filed: Apr. 13, 2007

(86) PCT No.: PCT/EP2007/003292
§ 371 (c)(1),
(2), (4) Date: Feb. 3, 2009

(87) PCT Pub. No.: WO2007/121876
PCT Pub. Date: Nov. 1, 2007

(65) Prior Publication Data
US 2009/0294686 A1    Dec. 3, 2009

(30) Foreign Application Priority Data
Apr. 18, 2006    (EP) .................................... 06007953

(51) Int. Cl.
*G01T 3/00* (2006.01)
*G08B 17/12* (2006.01)
(52) U.S. Cl. .................... 250/391; 250/390.01; 340/600
(58) Field of Classification Search .................. 250/391, 250/390.01, 385.1, 361 R, 374; 340/600
See application file for complete search history.

(56) References Cited

U.S. PATENT DOCUMENTS
4,286,158 A    8/1981    Charpak et al.
(Continued)

FOREIGN PATENT DOCUMENTS
WO    WO 2005/009886 A1    2/2005

OTHER PUBLICATIONS
Vanier et al., "Applications of Noble Gas Radiation Detectors to Counter-Terrorism" AIP Conference Proceedings, American Institute of Physics, New York, NY, US, vol. 632, Apr. 2002, pp. 37-45.
(Continued)

*Primary Examiner* — David Porta
*Assistant Examiner* — Faye Boosalis
(74) *Attorney, Agent, or Firm* — Pauley Petersen & Erickson

(57) ABSTRACT

A method for monitoring a container or the contents in a volume (39, 47), including allowing at least one of a beta, gamma, neutron, and proton radiation emerging from said container or volume (39, 47), and/or secondary particles or radiation brought forth by said radiation, to pass through a measuring volume (12, 12') of at least one radiation detector (10, 10', 10"), said measuring volume (12, 12') containing a noble gas and/or a noble gas isotope, or a mixture of noble gases and/or noble gas isotopes and detecting the photons generated within said measuring volume (12, 12') by an interaction (18, W1, ..., W4) of the radiation with the noble gas or noble gases and/or their isotopes of the measuring volume (12, 12'). The output of said photon detecting means (15, 16, 53) is then used to derive information about the container or the contents in said volume (39, 47), whereby this information is used to discriminate protons, neutrons, beta and gamma rays respectively.

34 Claims, 8 Drawing Sheets

U.S. PATENT DOCUMENTS

| | | | |
|---|---|---|---|
| 5,223,717 A | * | 6/1993 | Charpak ................. 250/374 |
| 5,479,023 A | * | 12/1995 | Bartle ................. 250/390.04 |
| 5,665,971 A | * | 9/1997 | Chen et al. ............. 250/385.1 |
| 5,679,956 A | | 10/1997 | Johnston |
| 6,768,421 B1 | | 7/2004 | Alioto et al. |
| 2003/0226971 A1 | | 12/2003 | Chandross et al. |
| 2005/0029460 A1 | | 2/2005 | Iwatschenko-Borho et al. |

OTHER PUBLICATIONS

Accatino et al., "The Nuclear Car Wash: A scanner to Detect Illicit Special Nuclear Material in Cargo Containers," IEEE Sensors Journal, vol. 5, No. 4, Aug. 2005, pp. 560-564.

Hitachi et al., "Effect of ionization density on the time dependence of luminescence from liquid argon and xenon," The American Phys. Society, Phys. Rev. B, vol. 27, No. 9, May 1, 1983, pp. 5279-5285.

Boulay et al., "Direct WIMP Detection Using Scintillation Time Discrimination in Liquid Argon," arXiv: astro-ph/0411358v1, Nov. 15, 2004, pp. 1-4.

Vanier et al., "Demonstration of a Directional Fast Neutron Detector," 2005 IEEE Nuclear Science Symposium Conference Record, N6-5, Oct. 14, 2005, pp. 116-119.

Chandrasekharan et al., "Noble Gas Scintillation-Based Radiation Portal Monitors and Active Interrogation Systems," 2006 IEEE Nuclear Science Symposium Conference, Nov. 27, 2006, pp. 1-4.

Pokachalov et al ., "Spark Discharge Method of Liquid Rare-Gas Purification," Nucl. Instr. and Meth. in Phys. Res. A327, (1993), pp. 159-162.

Fenimore et al., "Coded Aperture imaging with uniformly redundant arrays," Applied Optics, vol. 17, No. 3, pp. 337-437, Feb. 1, 1978.

Ziock et al., "Radiation Imaging of Dry-Storage Casks for Spent Nuclear Fuel." 2005 IEEE Nuclear Science Symposium Conference Record, N30-1, Nov. 11, 2005, pp. 1163-1167.

Nickles et al. "Studies of an Integrated Photosensor and Imaging Optics to Readout the Light from Gas Scintillation Proportional Counters," IEEE Transactions on Nuclear Science, vol. 49, No. 3, Jun. 2002, pp. 808-811.

A. Bolozdynya et al. "Detection of thermal neutrons in cylindrical ionization chamber filled with high-pressure Xe+<3>He gas mixture," Nuclear Inst. and Meth. in Phys. Res. Section A 522 (2004), pp. 595-597.

* cited by examiner

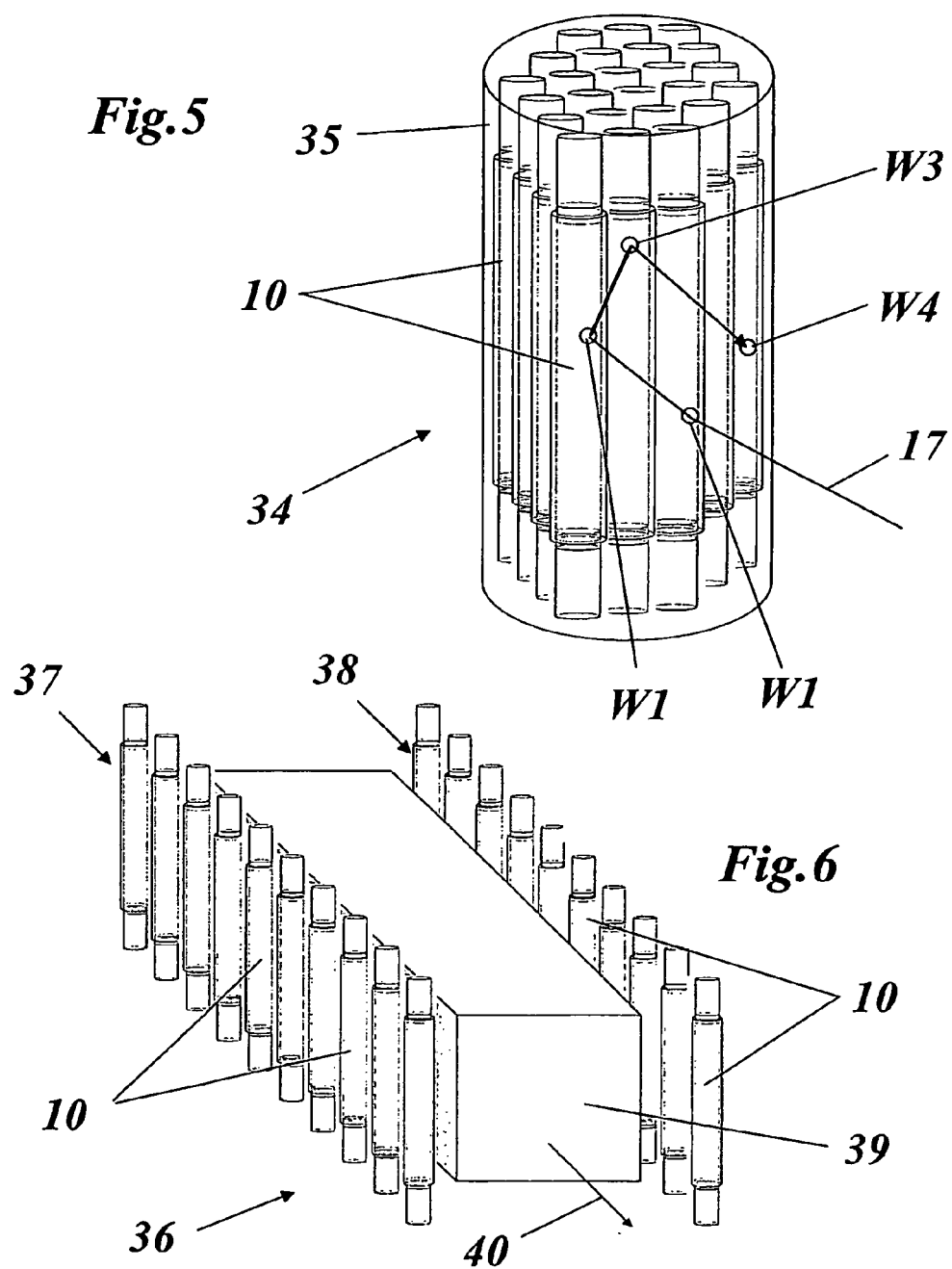

METHOD FOR MONITORING AN UNKNOWN CONTAINER OR THE CONTENTS IN A VOLUME, MONITORING SYSTEM FOR BEING USED WITH SAID METHOD, AND RADIATION DETECTOR FOR SUCH A MONITORING SYSTEM

FIELD OF THE INVENTION

The present invention relates generally to a method for monitoring an unknown container or the contents in a volume, a respective monitoring system, and a radiation detector for being used in such monitoring system.

BACKGROUND OF THE INVENTION

It is a challenge to assess the contents of container in a non-intrusive way. The desire to do so is often fuelled by the threats posed for example by radioactive or explosive contents.

For such purposes, passive and active assessment systems exist. Passive systems can be in the form of radiation portal monitors (RPMs). Such systems are composed of radiation detectors that detect radiation emitted by radioactive substances within the bulk in question. The prime drawbacks of conventional technologies used in RPMs are the following:

1. Plastic Scintillator technology (PVT), as disclosed in the U.S. Pat. No. 5,679,956: Has very poor energy resolution, preventing isotope identification. This leads to frequent innocent alarms due to naturally occurring radioactive material (NORM) or technically enhanced NORM (TENORM) material.
2. There are attempts to surmount these insufficiencies by using scintillating crystals (such as NaI(Tl)). The price of crystals prevents production of large devices, limiting their scalability.
3. Commonly used scintillation materials (such as the examples above) are not capable of distinguishing neutron from gamma ray signals.

Efforts have been made to perform such a task by using passive radiation detectors (see for example WO-A1-2005/009886 or U.S. Pat. No. 5,679,956 or U.S. Pat. No. 6,768,421 or US-A1-2005/0029460). The shortcomings of commonly employed solutions are various: Detectors with sufficient energy resolution to give clues to the source identity are too costly to use for a detector with a large detection volume. Further, to detect neutron-emitting substances, separate neutron detectors need to be installed, as most radiation detectors are not capable of discerning between neutron and gamma radiation (see the US-A1-2005/0029460).

A problem with passive monitoring is nuisance alarms caused by naturally occurring radioactive materials (NORM) and technically enhanced naturally occurring radioactive materials (TENORM). To avoid such incidents, it is desirable to have a detector that can measure the spectrum of the detected radiation in order to identify the source isotope. A further way to reduce nuisance alarms is the use of a detector capable of discerning strong point sources from conglomerations of weak sources in a large partial volume. A powerful distinction criterion between benign and harmful radioactive sources is the uniformity of emission. While benign sources often are large volumes of low activity material, dangerous sources often are much more point like.

Active systems consist of a radiation source of some and a detector of some form. The bulk in question is illuminated by the radiation source referred to as the interrogating radiation. The radiation of the radiation source is commonly in the form of neutrons and/or gamma rays. The detector can measure the effects of the materials within the bulk in question on the interrogating radiation. Such effects may be attenuation, scattering, or neutron resonance. The detector may also measure radiation emitted upon stimulation by the interrogating beam, due to physical processes such as stimulated fission or photo fission.

The invention is a response to the demand for new technologies for the assessment of materials in a bulk volume. In particular, for homeland security purposes, systems capable of quantifying the threat posed by containers, trucks, trains, or other freight forms are seeked. Explosives or radioactive substances for use in dirty bombs or nuclear weapons may pose these threats.

The challenge can be stated as the following: Conceive a detector whose scalability to large dimensions is feasible from a technical and from a financial point of view, which is capable of detecting and discerning neutrons from other forms of radiation, as well as giving the most precise possible information regarding the energy of the incident radiation. The detector ideally provides means for identifying point sources.

On the other hand, radiation detectors using noble gas have been used for radiation detection from small scales up to very large scales. For example, the ICARUS collaboration has deployed neutrino detectors with hundreds of tons of detector volume. In most noble gas based detectors, the ionization charge brought forth by energy radiation interactions is measured.

It has already been suggested that different particles, i.e. alpha particles, electrons, and fission fragments, lead to different scintillation pulse shapes in liquid argon and liquid xenon (see for example Hitachi et al. Phys. Rev. B, 27(9), p. 5279-5285 (1983)). This effect is assumed to be brought forth by the fact that different particles interact differently with the target material, transferring their energy either to target nuclei or target electrons, or to a combination of the two. The effect is also assumed to depend on the density of energy deposition.

Recently, it has been proposed (Boulay et al., Direct WIMP Detection Using Scintillation Time Discrimination in Liquid Argon, arXiv: astro-ph/0411358v1 (15 Nov. 2004)) to use this fact to detect dark matter in the form of WIMPs (Weakly Interacting Massive Particles). The proposed detector is based solely on the detection of liquid neon or argon scintillation light to discern between WIMPs and the internal background caused mainly by beta radioactivity proceeding from detector components, in particular radioactive impurities in the noble gas. The method of discrimination relies on the different scintillation light pulse shape emitted by beta as opposed to assumed WIMPS interactions.

Passive monitoring procedures are commonly used to detect illicit radioactive sources in containers. For this purpose, plastic scintillators are often employed, detecting the gamma ray count rate. Efforts have been made to construct and deploy detectors relying on scintillating crystals in order to measure the radiation spectrum and identify the source isotope.

Active interrogation techniques have been proposed, where the working principle includes a radiation source and a detector. Material assessment is performed, relying on physical effects such as induced fission, photo fission, nuclear fluorescence, and beam attenuation.

Liquid noble gas ionization drift chambers have been proposed for active interrogation with cosmic muons.

Imaging techniques using gamma rays (Compton imaging) or neutrons are described in scientific publications. For neutrons, a good description of this technique is given in 2005

IEEE Nuclear Science Symposium Conference Record, "Demonstration of a directional Fast Neutron Detector" by P. E. Vanier.

DESCRIPTION OF THE INVENTION

It is therefore an objective of the invention, to provide a method for monitoring the unknown contents in a volume, a respective monitoring system, and a radiation detector for being used in such a monitoring system, which avoid the disadvantages of the prior art methods, systems and detectors, have an improved resolution, and are simpler to install and operate.

This objective is achieved by the solutions according to claims 1, 14 and 23.

The invention proposed here relies on a pulse shape discrimination method discriminating between fast neutrons and gamma rays penetrating into the noble gas based detector from the outside. This allows the deployment of the apparatus for the assessment of materials as described below.

Noble gas in general is a price worthy scintillator of high light yield. Noble gases, permitting discrimination between neutron and gamma ray events on grounds of their different pulse shapes, allow the design of scalable, multifunctional detectors: In a single unit, such an apparatus is capable of detecting neutrons and other radiation, and performing spectroscopy of the measured radiation. This allows assessment of the radiation source if the device is used as part of a passive screening system.

In an embodiment as part of an active screening unit, the same qualities allow assessment of the material via methods described below.

According to an embodiment of the invention the processing step comprises the steps of comparing the derived spectrum with known spectra stored in a database; and issuing an alarm, when the derived spectrum is characteristic for a dangerous material contained in said volume, whereby the comparison of the derived spectrum with the spectra of the database gives a threat-likelihood; and the alarm is issued, when the threat-likelihood is above an adjustable threshold.

According to another embodiment of the invention the wavelength of the photons generated by the interaction is shifted by means of a wavelength-shifting material before the photons are detected by means of said photondetecting means.

In another embodiment of the invention the measuring volume extends along an axis and the photon detecting means are positioned at opposite ends of the measuring volume with respect to said axis, and photons, which do not directly hit the photon detecting means, are reflected towards the photon detecting means by means of a reflecting wall surrounding said measuring volume, whereby all photons are detected within a first given time period by means of said photondetecting means, when two or more photon detecting means coincidentally detect a photon within a second given time period, the first given time period having a typical length of a few microseconds, and the second given time period having a typical length of a few nanoseconds.

According to another embodiment of the invention a plurality of radiation detectors is arranged in a detector cluster; the gamma radiation and/or fast neutrons undergo multiple scattering within the measuring volume of various radiation detectors of said detector cluster; and the photons detected by means of the photon detecting means of the various radiation detectors of said detector cluster are used to derive information on the incident particles. In addition, the radiation may pass through a coded aperture before entering the radiation detectors and a decoding algorithm is used to derive directional information on the trajectories of the incident particles.

According to another embodiment of the invention the volume with the unknown contents is moved along at least one row of radiation detectors while monitoring the unknown contents in said volume.

According to another embodiment of the invention an interrogation beam from a radiation source emitting photons or neutrons is sent through the volume to be screened, whereby the interrogation beam splits up into a remnant interrogation beam and a scattered interrogation beam; and the remnant interrogation beam and/or the scattered interrogation beam and/or radiation generated by stimulated emission in the unknown contents is measured by means of the at least one radiation detector. Either a pulsed interrogation beam or a continuous interrogation beam may be used.

According to an embodiment of the monitoring system of the invention the at least one radiation detector comprises an elongated measuring volume extending along an axis; there are two photon detecting means provided at opposite ends of the measuring volume with respect to the axis; and the signal processing means comprises a coincidence unit connected to the two photondetecting means. A plurality of radiation detectors are arranged next to each other in a detector arrangement with their axes being in parallel, wherein the radiation detectors are arranged in at least one detector cluster. The radiation detectors of each of the detector clusters may share a common volume of noble gas or of a mixture of noble gases.

According to another embodiment the radiation detectors are arranged in at least one detector row, especially in parallel detector rows. On the other hand, the radiation detectors may be arranged in orthogonal detector arrangements.

In another embodiment a radiation source is provided for sending an interrogation beam through said volume with said unknown contents.

According to an embodiment of the inventive radiation detector the measuring volume is bounded by a container; and the photon detecting means are optically coupled to the measuring volume by means of light guides, which are coated at their measuring volume sides with a wavelength shifting coating.

The inner walls of the container may be covered with a photon reflecting coating, especially of PTFE or $MgF_2$ coated Al.

On the other hand, the inner walls of the container may be covered with a wavelength shifting coating, especially of tetraphenyl butadiene (TPB) and/or P-Terphenyl or a mixture containing one or more of these substances.

According to another embodiment of the invention the noble gas or noble gas mixture or mixture of noble gases and/or noble gas isotopes in the measuring volume is in the liquid state or in the pressurized gas phase.

According to another embodiment of the invention the noble gas or noble gas mixture or mixture of noble gases and/or noble gas isotopes in the measuring volume is contained in an inflatable container. The respective detector may therefore be an airborne device.

According to another embodiment of the invention the noble gas or noble gas mixture or mixture of noble gases and/or noble gas isotopes in the measuring volume is in contact with an in-situ purification means, which is especially based on an impurity-gettering spark gap.

According to another embodiment of the invention the noble gas or noble gas mixture or mixture of noble gases and/or noble gas isotopes used in the measuring volume is purified in-situ.

BRIEF DESCRIPTION OF THE DRAWINGS

The subject matter of the invention will be explained in more detail in the following text with reference to preferred exemplary embodiments, which are illustrated in the attached drawings, in which:

FIG. 5 shows an embodiment of the invention, wherein several radiation detectors are grouped to a detector cluster, sharing the noble gas of a common noble gas vessel; wherein the cluster may be used as an imaging system;

FIG. 6 shows how, according to another embodiment of the invention, several radiation detectors can arranged in detector rows to be operated together in a passive monitoring system;

DETAILED DESCRIPTION OF PREFERRED EMBODIMENTS

Figure 1:
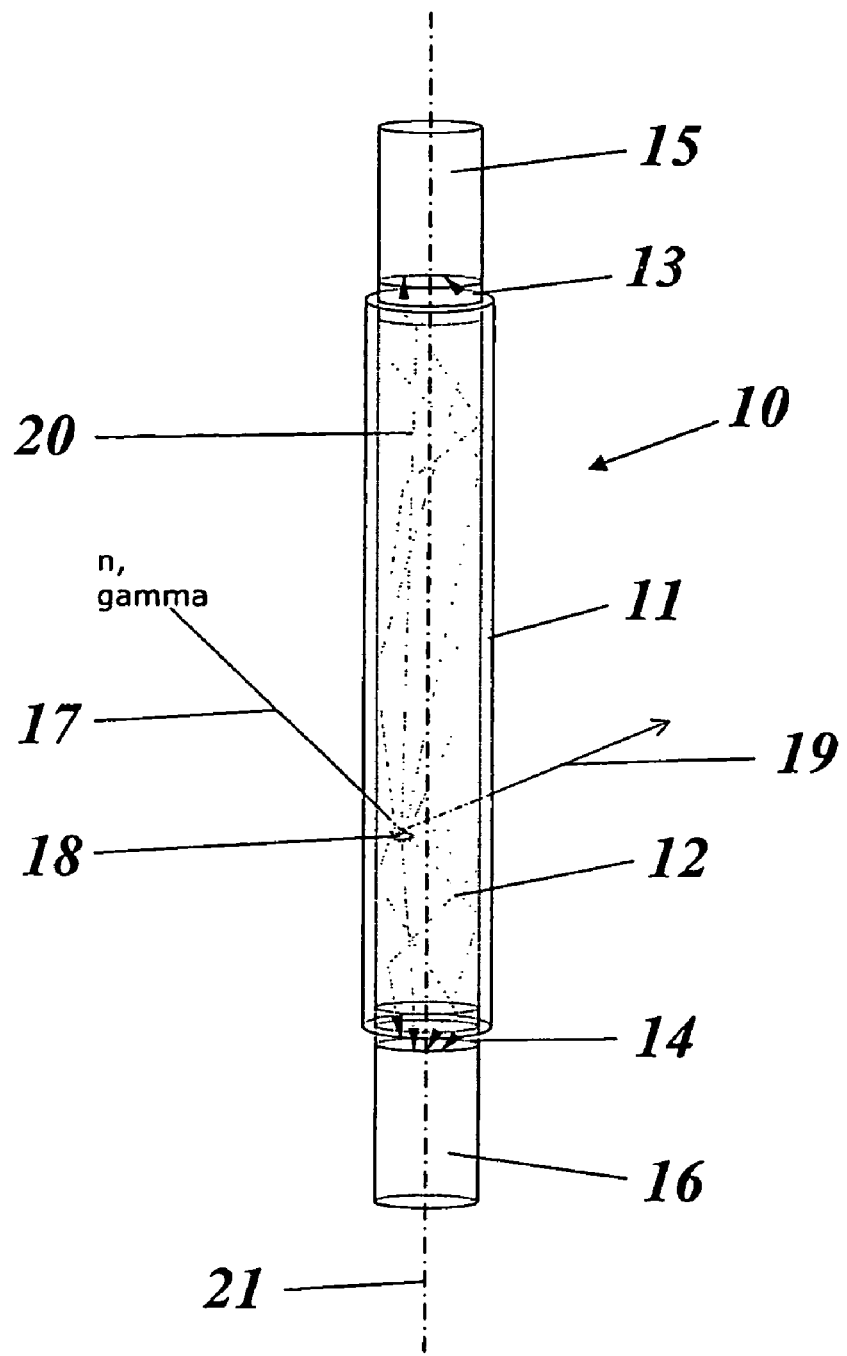
FIG. 1 shows a single radiation detector according to an embodiment of the invention with incoming radiation depositing energy in the detector by interaction with a noble gas in the measuring volume.

FIG. 1 shows a single radiation detector according to an embodiment of the invention. The radiation detector 10 comprises a cylindrical, elongated container 11, which extends along a longitudinal axis 21 and contains a measuring volume 12 of noble gas, especially argon, neon or helium, or a mixture of any of these gases or their isotopes, e.g. helium-3. The noble gas or noble gas mixture in the measuring volume 12 is in the liquid state or in the pressurized gas phase. An incident ray 17, typically a neutron or a gamma ray, deposits energy in the radiation detector 10. An energy-dependent part of the deposited energy is converted by an interaction 18 with the noble gas into scintillation photons 20. Some of these scintillation photons 20 arrive at two photon counters 15, 16 or other comparable photon detecting means arranged at opposite ends of the measuring volume 12. The photon counters 15, 16 are optically coupled to the measuring volume 12 via light guides 13, 14 (FIG. 1, 2). The scintillation photons 20 may possibly be shifted in wavelength and reflected at the wall of the container 11. The photon counter closer to the point of the interaction 18 typically detects more photons. The elongated geometry of the measuring volume 12 is advantageously for material analysis.

An example of how the classification of radiation types detected by the invention may be achieved can be found in "2006 IEEE Nuclear Science Symposium Conference Record, "Noble Gas Scintillation-Based Radiation Portal Monitors and Active Interrogation Systems" by R. Chandrasekharan et al. (2006 IEEE Nuclear Science Symposium Conference, Oct. 29-Nov. 4, 2006, San Diego, Calif.).

Figure 2:
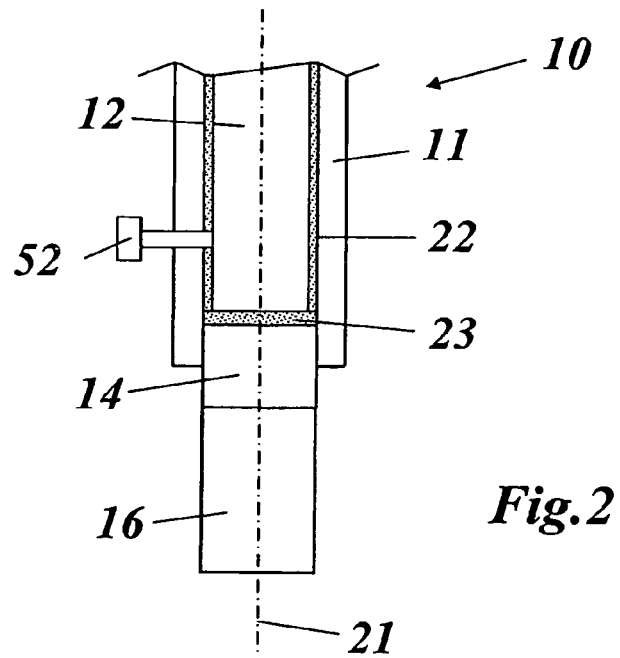
FIG. 2 shows a cutout of the detector according to FIG. 1.

As is shown in FIG. 2 in greater detail, the measuring volume 12 with the noble gas is confined in an elongated container or vessel 11 terminated by view ports in the form of light guides 13, 14 made of an optically transparent material such as PMMA or quartz glass. Each of these light guides 13, 14 is optically coupled to a photon counting device or photon counter 15, 16, for instance a photomultiplier tube (PMT). The short wavelength (VUV or below) noble gas scintillation light, to which most materials are opaque, can be reflected off the container walls, for example by a reflector made of PTFE or $MgF_2$ coated Al, until it reaches one of the light guides 13, 14. Else, or additionally, the container walls may be coated with a wavelength shifting (wls) coating 22 such as Tetraphenyl Butadiene (TPB) or P-Terphenyl, or a mixture containing one or both components, with the purpose to down-convert the scintillation photons 20 to a more practical wavelength, for instance 420 nm. Such down-converted photons can easily be reflected until they reach the terminating light guide 13 or 14. The face of the light guide 13, 14 exposed to the measuring or detection volume 12 can also be coated with a wavelength shifting (wls) coating 23, that is transparent to its own emission wavelength. This may be achieved by dip coating with a polystyrene-TPB-chloroform solution. The light guides 13, 14 conducts photons to the respective photon counter 15, 16, either by total internal reflection or due to a reflective coating or wrapping not explicitly shown in FIG. 2.

As has been said already, possible noble gases to be employed may be pure argon, neon, helium, or mixtures of pure noble gases. The gas choice may be optimized for optimal performance in the specific embodiment. Light gases may be better suited for neutron detection for kinematics reasons. On the other hand, heavier gases have higher density, resulting in a higher light yield, and longer wavelength emission. Mixing noble gases (doping) leads to a wavelength conversion. As the purity of the noble gases is essential for the detection process used, it is advantageous to have an in-situ gas purification. Accordingly, as shown in FIG. 2, a noble gas purification means 52 may be arranged at or in the detector 10 in contact with the noble gas. The noble gas purification means 52 may contain a spark gap with electrodes made of a gettering metal, as has been described in an article of S. G. Pokachalov et al., "Spark discharge method of liquid rare-gas purification", Nucl. Instr. And Meth. A327 (1993) 159-162.

Figure 10:
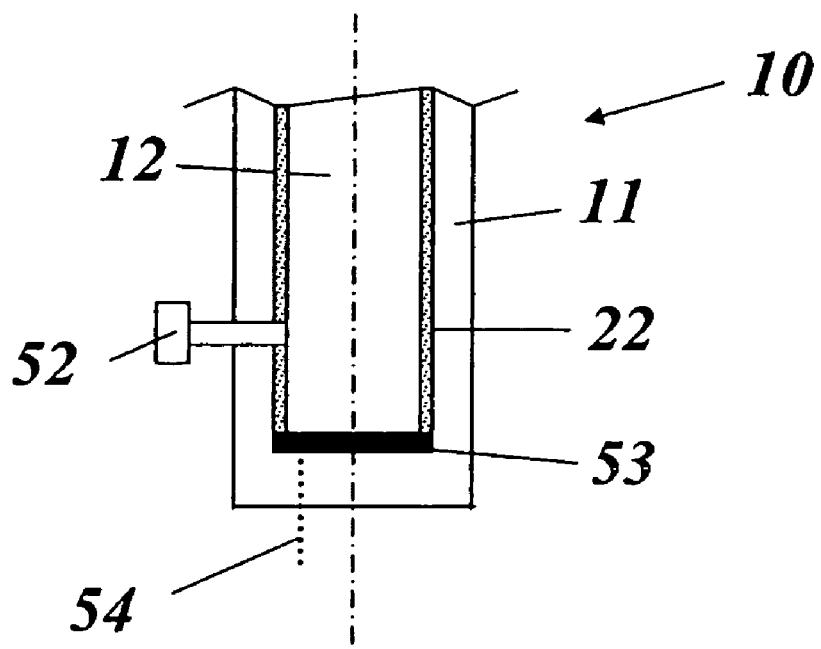
FIG. 10 shows a single radiation detector according to another embodiment of the invention, wherein the photon detecting means, especially solid state devices like avalanche photodiodes, are located at any position inside the noble gas volume.

Furthermore, FIG. 10 shows a single radiation detector according to another embodiment of the invention. The photons are detected by photon detectors 53, that can be enclosed by the container 11 to be inside the measuring volume 12, eliminating the need for light guides. The photon detectors 53 may be solid state devices (e.g. avalanche photodiodes) sensitive to the noble gas scintillation light and/or a shifted wavelength of this light. The photon detectors are connected to the detector electronics by some form of feed-through 54. In this embodiment, high detection yields can be achieved by reducing eliminating losses arising from light guides, as well as through convenient photon detector placement and area coverage.

The gas may be in the liquid phase or in a pressurized gas phase, such as to optimize the gas density for ideal performance in the desired application. With reducing density, the detector becomes less sensitive to gamma rays. This effect may be desired when neutron detection has high priority.

Figure 9:
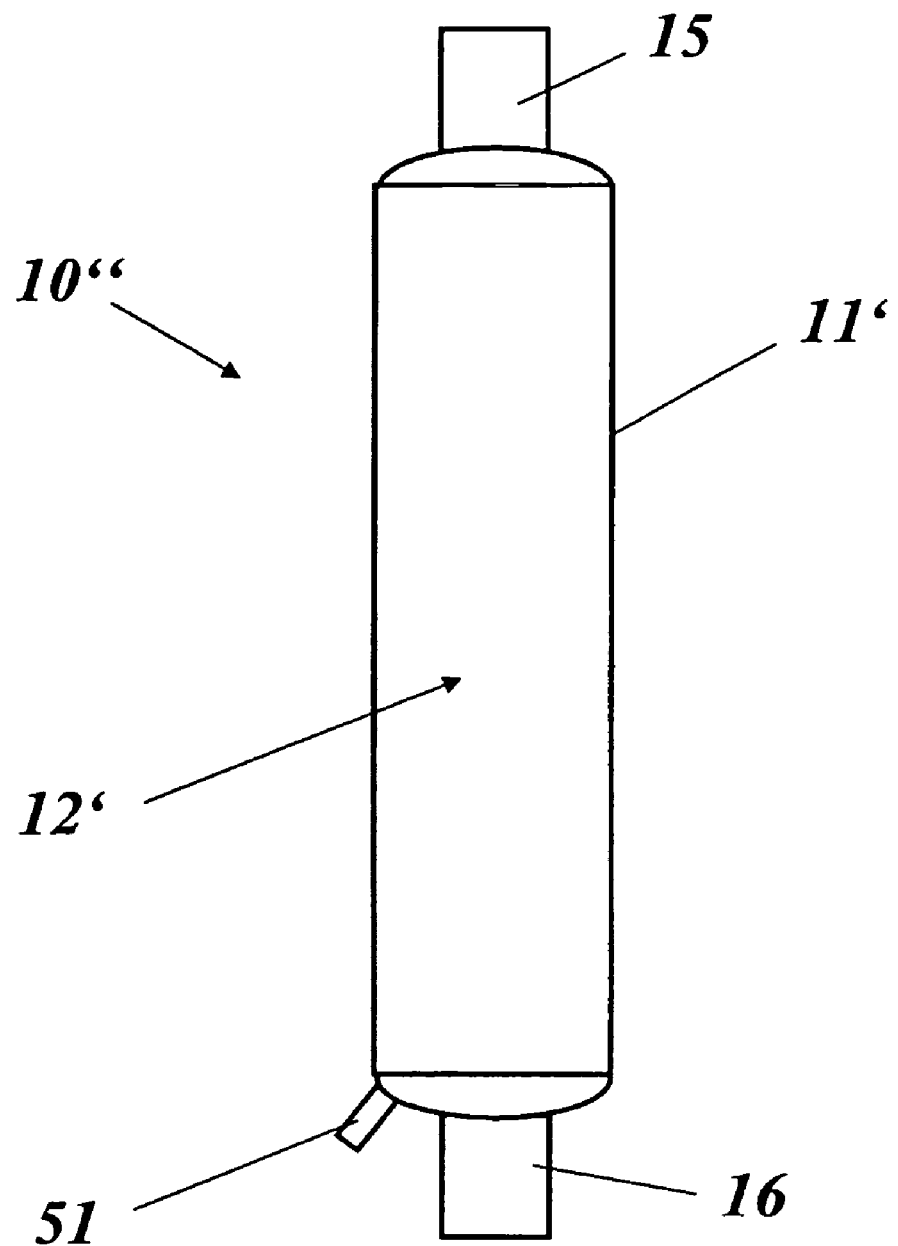
FIG. 9 shows a single radiation detector according to another embodiment of the invention with incoming radiation depositing energy in the detector by interaction with a noble gas contained in an inflatable container.

Furthermore, as shown in FIG. 9, the radiation detector 10" may be of an inflatable design, whereby the container 11' is made of rubber or any other light weight, gas tight, possibly flexible and/or elastic, material. The noble gas is filled into the container 11' by means of a valve 51. The photon counters or photon detecting means 15, 16 are used as terminations of the container 11'. The shape of the container 11' may be cylindrical or spherical or of another suitable form. When helium is used as a gas, the detector 10" may rise into the air like a balloon or zeppelin to be used as an airborne detector. Such an inflatable detector 10" can be made small when not used, can have a big measuring volume 12' to detect radiation even at a longer distance to the object to be inspected, and can be easily manufactured and installed. It may be used not only for monitoring a container or the contents in a volume, as explained in this application, but for any other noble-gas-based detecting applications.

Figure 3:
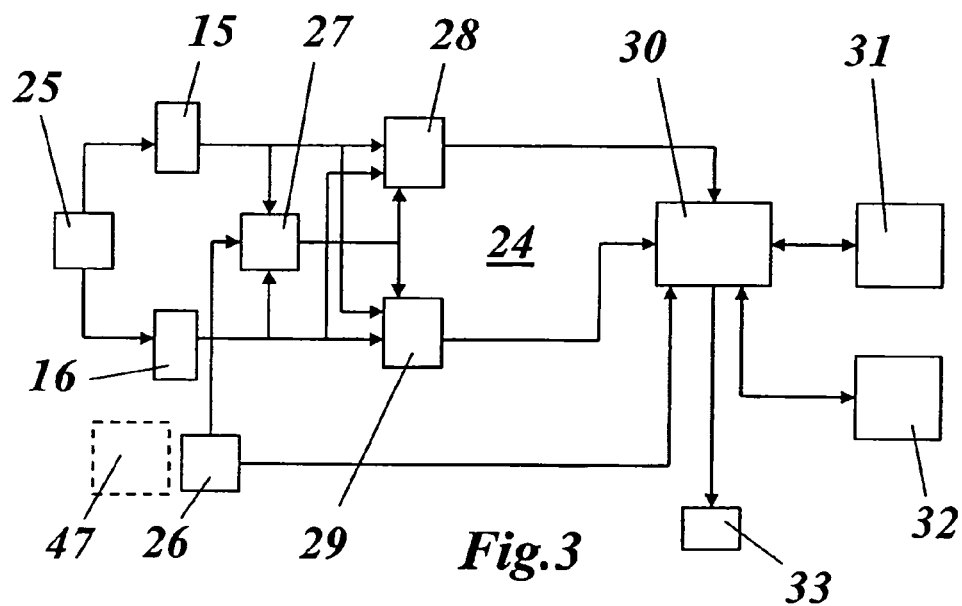
FIG. 3 shows the simplified circuit of a measuring system with one radiation detector according to an embodiment of the invention.
Figure 4:
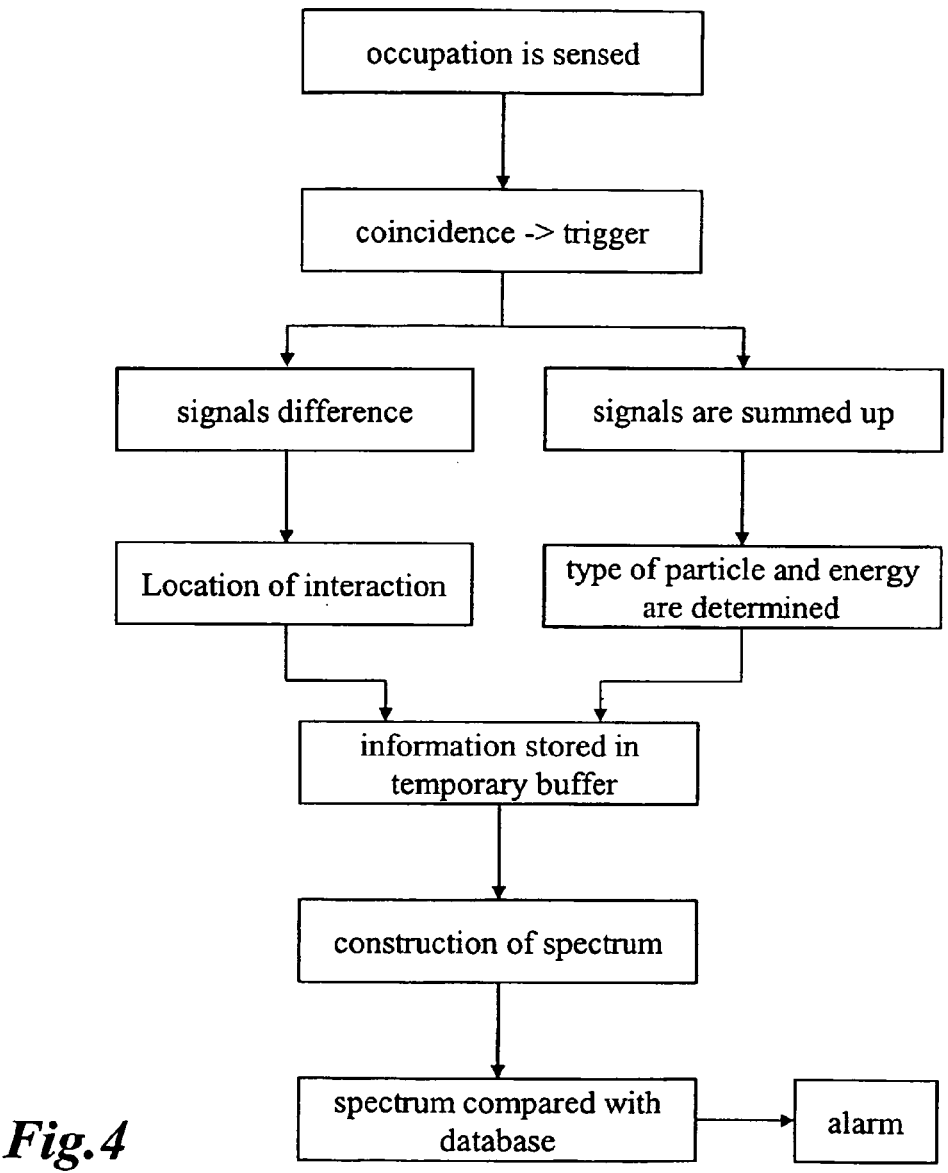
FIG. 4 shows various steps within a method for operating the measuring system according to FIG. 3.

FIG. 3 illustrates a measuring system 24 according to an embodiment of the invention with a simplified circuit layout for triggering and data analysis. The operating steps of the system are illustrated in FIG. 4.

An occupation sensor 26 arms the data acquisition chain, when a volume 47 in question, for example a truck or container, is in place. A coincidence unit 27 gives a trigger if more than one of the photon counters 15, 16 detects a photon within a short time window, typically of the order of a few nanoseconds. Given a trigger, the event, that means the full information on detected photons in all photon counters 15, 16 within a designated time window, is recorded. This time window extends from typically tens of nanoseconds before the trigger time to typically a few microseconds after the trigger time. By comparing the number of photons detected at each end of the measuring volume 12, the z-coordinate (vertical coordinate in a system like that of FIG. 6 or 7) of the interaction can be measured. The x and y coordinates of the interaction are given by the coordinates of the detector in which the interaction took place. The signals are at the same time summed up in a summation unit 28 and subtracted in a subtraction unit 29. A processing unit 30 interacts with a buffer storage 31 and a database 32. By fitting the shape of the sum of the signals, the type of particle (neutron or gamma), as well as the amount of deposited energy can be determined. The information from these analyses is stored in the temporary buffer storage 31. Out of this information, spectra are constructed, increasing in precision with time as many events are acquired. These spectra are compared with data from the database 32, giving a threat-likelihood. If the threat-likelihood is above an adjustable threshold, an alarm is issued at an output unit 33. When the measurement is completed, the occupation sensor 26 turns off, and the buffered information from buffer storage 31 is stored in the database 32, clearing the buffer storage 32 for a new measurement.

Figure 8:
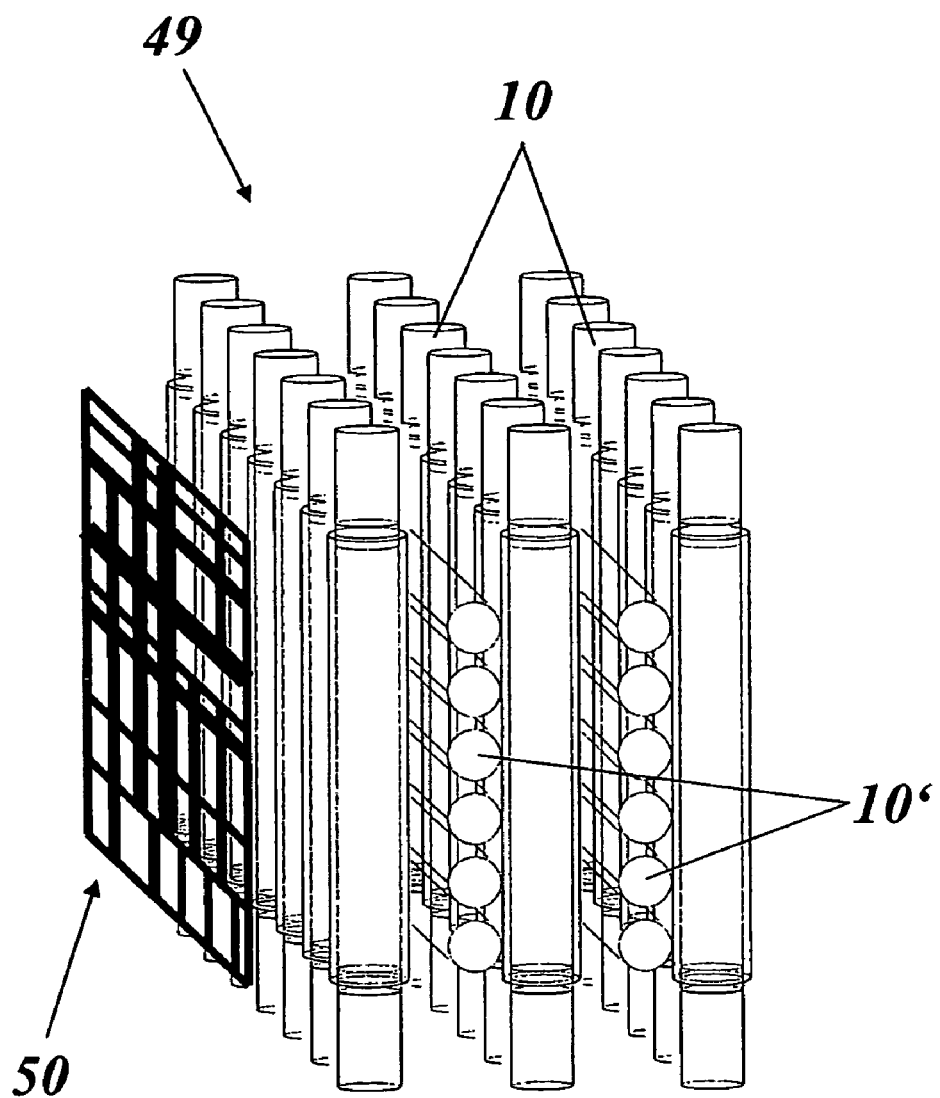
FIG. 8 shows a detector arrangement with crossed rows of radiation detectors and a coded aperture used with this arrangement for imaging in accordance with the invention.

FIG. 5 shows an embodiment of the invention, wherein several identical radiation detectors 10 are arranged in and operated together as a detector cluster 34. This detector cluster 34 may be useful for increasing the sensitive or measuring volume of the system and/or allowing directional or imaging applications. An incident gamma ray 17 or neutron can undergo multiple scattering. If the interaction points W1, . . . , W4 of such a process are located within the cluster's detection volume, information on the trajectory of the incident particles can be extracted. This is done by measuring the coordinates of the interactions W1, . . . , W4, given in part by the z coordinate and the x-y coordinates of the radiation detectors 10, the time and the deposited energy of each interaction W1, . . . , W4. This technique has been shown to be feasible with neutrons (neutron imaging) as well as gamma rays (Compton imaging). Directional information of this sort allows identification of point sources. The directional information may be derived in a different way by a so-called coded aperture imaging method (see for example E. E. Fenimore et al., Applied Optics, Vol. 17, no. 3 (1978)). As is shown in FIG. 8 in a simplified scheme, the radiation may pass through a coded aperture 50 before entering a detector arrangement 49 with a cluster of radiation detectors 10, 10'. A decoding algorithm is then used to derive directional information on the trajectories of the incident particles from the photons counted by the photon counters of the various radiation detectors 10, 10'.

The geometric cross section of each radiation detector 10 may be optimized for dense packing, for example by using hexagonal measuring volumes. The individual measuring volumes of each detector do not necessarily need to be identical with the noble gas container. The volumes may be defined by reflective/wavelength-shifting foil and the noble gas contained by larger vessel 35 surrounding all radiation detectors 10 (FIG. 5).

FIG. 6 shows a possible embodiment of the invention with a monitoring system 36, wherein a plurality of radiation detectors 10 is arranged in detectors rows 37, 38 to form a passive detection system, said detectors rows 37, 38 extending on opposite sides along the volume in question, which may be a truck, a train, or a freight container 39 on a conveyor belt moving in a direction 40. The container 39 in question is passed alongside the detector. Sufficiently penetrating radiation from possible radioactive sources within the container 39 passes through the systems fiducial measuring volume. A certain fraction of this radiation will deposit sufficient energy within the detector volume to allow detection. Although the monitoring system 36 of FIG. 6 is a stationary one, it may sometimes be advantageous to miniaturize it to get a handheld system, or to make it a vehicle-based system, which can be moved to different locations, when needed.

Such a distributed arrangement may be advantageous for discerning strong point sources from weak sources distributed over larger volume. Due to the $1/r^2$ standoff intrinsic to radiation, the interaction rate is higher in the measuring volumes of those detectors, which are at closer proximity to the source.

Figure 7:
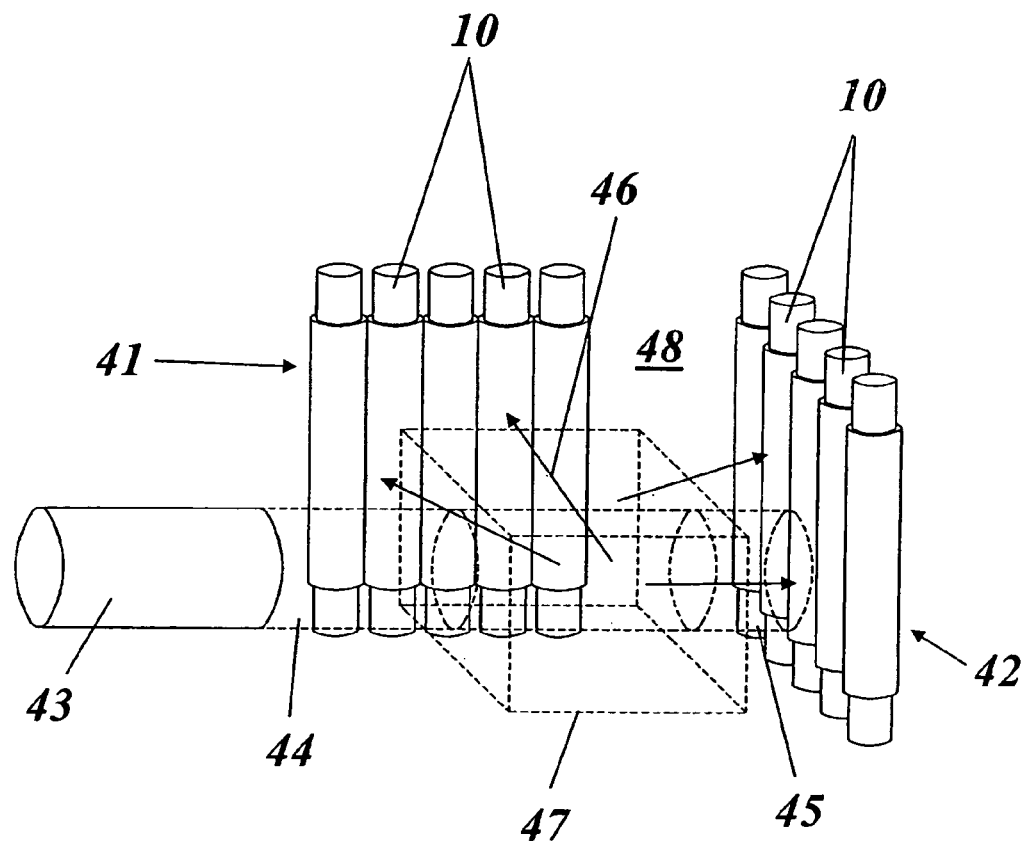
FIG. 7 shows an embodiment of the invention using the radiation detectors in an active interrogation system.

FIG. 7 shows another embodiment of the invention with a possible arrangement for an active interrogation system 48. A radiation source 43 directs an interrogation beam 44 to the volume 47 in question. A first detector arrangement 42 positioned behind the volume 47 in question receives the remnant interrogation beam 45 coming out of the volume 47 in line with the interrogation beam 44. A second detector arrangement 41 positioned at one side of the volume 47 receives the scattered interrogation beam 46. The detector arrangements 41 and 42 each comprise plural rows of detectors arranged one behind the other in closest packing; only the first row is shown in FIG. 7. The active interrogation system 48 is used as a detector for the remnant and/or scattered interrogation beam 45, 46 and/or stimulated emission radiation from the material in question. The interrogation beam 44 may be emitted by any photon or neutron source as the radiation source 43. The interrogation beam 44 may be continuous or pulsed.

Although the detector arrangements described so far comprise only a group of radiation detectors oriented in parallel, other detector arrangements may be advantageous, where various radiation detectors are oriented in different directions. FIG. 8 shows a detector arrangement 49, wherein rows of radiation detector 10 and 10' are arranged in a crossed configuration.

The method and system according to the invention may furthermore be used not for the monitoring of the contents of a container but for identifying a container itself, i.e. for radiation imaging of casks (containers) for spent nuclear fuel (see for example K. P. Ziock et al., Radiation Imaging of Dry- Storage Casks for Spent Nuclear Fuel, IEEE Nuclear Science Symposium Conference Record, N30-1, p. 1163-1167 (2005)). Such a container is characterized by a radiation "fingerprint", which may be used to monitor the location and/or transport of the casks.

LIST OF REFERENCE NUMERALS 10,10',10" radiation detector
11,11' container
12,12' measuring volume
13,14 light guide
15,16 photon counter (e.g. PMT)
17 incident ray (gamma and/or neutron)
18 interaction
19 emerging ray
20 scintillation photon
21 axis
22,23 wls coating
24 measuring system
25 power supply
26 occupation sensor
27 coincidence unit
28 summation unit
29 subtraction unit
30 processing unit
31 buffer storage
32 database
33 output unit (alarm)
34 detector cluster
35 vessel
36 monitoring system
37,38 detector row
39 container
40 direction
41,42 detector arrangement
43 radiation source
44 interrogation beam
45 remnant interrogation beam
46 scattered interrogation beam
47 volume in question
48 active interrogation system
49 detector arrangement
50 coded aperture
51 valve
52 noble gas purification means
53 photon detector (e.g. avalanche photodiode)
54 feed-through
W1, ..., W4 interaction

The invention claimed is:

1. A method for monitoring a container or the contents in a volume (39, 47), comprising the steps of:
    allowing at least one of a beta, gamma, neutron, and proton radiation emerging from said container or volume (39, 47), and/or secondary particles or radiation brought forth by said radiation, to pass through a measuring volume (12, 12') of at least one radiation detector (10, 10', 10"), said measuring volume (12, 12') containing a noble gas and/or a noble gas isotope, or a mixture of noble gases and/or noble gas isotopes;
    detecting scintillation photons generated within said measuring volume (12, 12') by an interaction (18, W1, ..., W4) of the radiation with the noble gas or noble gases and/or their isotopes of the measuring volume (12, 12') by means of a photon detecting means comprising photon counters or avalanche photodiodes, (15, 16, 53); and
    deriving from the output of said photon detecting means (15, 16, 53) information to discriminate protons, neutrons, beta and gamma rays, respectively, exclusively on the basis of scintillation pulse shapes, thereby deriving information about the container or the contents in the volume.

2. The method according to claim 1, wherein the processing step comprises the steps of:
    deriving from the output of said photon detecting means (15, 16, 53) a spectrum of the radiation passing through the measuring volume (12, 12');
    comparing the derived spectrum with known spectra stored in a database (32); and
    issuing an alarm, when the derived spectrum is characteristic for a dangerous material contained in said volume (39, 47).

3. The method according to claim 2, further comprising the steps of:
    obtaining a threat-likelihood from the comparison of the derived spectrum with the spectra of the database; and
    issuing the alarm when the threat-likelihood is above an adjustable threshold.

4. The method according to claim 1, wherein the wavelength of the scintillation photons generated by the interaction is shifted by means of a wavelength-shifting material (22, 23) before the scintillation photons are counted by means of said photon detecting means (15, 16, 53).

5. The method according to claim 1, wherein:
    the measuring volume (12, 12') extends along an axis (21) and the photon detection means (15, 16, 53) are positioned at opposite ends of the measuring volume (12, 12') with respect to said axis (21), and
    reflecting the scintillation photons which do not directly hit the photon detecting means (15, 16, 53) towards the photon detecting means (15, 16, 53) with a reflecting wall (11, 11') surrounding said measuring volume (12, 12').

6. The method according to claim 5, wherein:
    all scintillation photons are detected within a first given time period by means of said photon detecting means (15, 16, 53), when two or more photon detecting means coincidentally detect a photon within a second given time period.

7. The method according to claim 6, wherein:
    the first given time period has a typical length of a few microseconds, and the second given time period has a typical length of a few nanoseconds.

8. The method according to claim 1, wherein:
    a plurality of radiation detectors (10, 10') is arranged in a detector cluster (34, 49);
    gamma radiation and/or fast neutrons undergo multiple scattering (M1, . . . ,M4) within the measuring volume (12) of various radiation detectors (10, 10') of said detector cluster (34, 49); and
    the scintillation photons detected by means of the photon detecting means (15, 16, 53) of the various radiation detectors (10, 10') of said detector cluster (34, 49) are used to derive information on the incident particles.

9. The method according to claim 8, wherein:
    the radiation passes through a coded aperture (50) before entering the radiation detectors (10, 10'); and
    a decoding algorithm is used to derive directional information on the trajectories of the incident particles.

10. The method according to claim 1, wherein:
    the volume (39) with the unknown contents is moved along at least one row (37, 38) of radiation detectors while monitoring the unknown contents in said volume (39).

11. The method according to claim 1, wherein:
an interrogation beam (44) from a radiation source (43), especially emitting photons or neutrons, is sent through the volume (47) to be screened, whereby the interrogation beam (44) splits up into a remnant interrogation beam (45) and a scattered interrogation beam (46); and
the remnant interrogation beam (45) and/or the scattered interrogation beam (46) and/or radiation generated by stimulated emission in the unknown contents is measured by means of the at least one radiation detector (10, 10').

12. The method according to claim 11, wherein a pulsed interrogation beam (44) is used.

13. The method according to claim 11, wherein a continuous interrogation beam (44) is used.

14. A monitoring system (36, 48) for use with the method according to claim 1, said monitoring system (36, 48) comprising:
a measuring system (24) for measuring one of a beta, gamma, neutron and proton radiation emerging from a container or volume (39, 47) with a contents, and/or secondary particles or radiation brought forth by said radiation;
within said measuring system (24) at least one radiation detector (10, 10', 10") with a measuring volume (12, 12') containing a noble gas and/or a noble gas isotope, or a mixture of noble gases and/or noble gas isotopes;
at least one photon detecting means, especially photon counters or avalanche photodiodes (15, 16, 53), arranged at said measuring volume (12, 12') to detect scintillation photons emerging from said measuring volume (12, 12'); and
signal processing means (27, . . . ,32) for processing signals from said at least one photon detecting means (15, 16, 53), said signal processing means (27, . . . 32) being able to discriminate between photons generated by a scintillation interaction of the measuring volume with the different kinds of radiation, especially with gamma radiation and fast neutrons, based exclusively on scintillation pulse shapes, thereby deriving information about the container or the contents in the volume.

15. The monitoring system according to claim 14, wherein:
the at least one radiation detector (10, 10', 10") comprises an elongated measuring volume (12, 12') extending along an axis (21);
there are two photon detecting means (15, 16, 53) provided at opposite ends of the measuring volume (12, 12') with respect to the axis (21); and
the signal processing means (27, . . . ,32) comprises a coincidence unit (27) connected to the two photon detecting means (15, 16, 53).

16. The monitoring system according to claim 15, wherein a plurality of radiation detectors (10, 10') are arranged next to each other in a detector arrangement (34; 37, 38; 41, 42, 49) with their axes (21) being in parallel.

17. The monitoring system according to claim 16, wherein the radiation detectors (10) are arranged in at least one detector cluster (34).

18. The monitoring system according to claim 17, wherein the radiation detectors (10, 10') of each of the detector clusters share a common volume of noble gas or of a mixture of noble gases.

19. The monitoring system according to claim 16, wherein the radiation detectors (10) are arranged in at least one detector row (37, 38).

20. The monitoring system according to claim 19, wherein the radiation detectors (10) are arranged in parallel detector rows (37, 38).

21. The monitoring system according to claim 16, wherein the radiation detectors (10) are arranged in orthogonal detector arrangements (41, 42).

22. The monitoring system according to claim 14, wherein a radiation source (43) is provided for sending an interrogation beam (44) through said volume (39, 47) with said unknown contents.

23. A radiation detector (10, 10") for a monitoring system (36, 48) according to claim 14, comprising:
a measuring volume (12, 12') containing a noble gas or a mixture of noble gases; and
at least one photon detecting means, especially photon counter or avalanche-photodiode (15, 16, 53), arranged at said measuring volume (12, 12') to detect photons emerging from said measuring volume (12, 12').

24. The radiation detector according to claim 23, wherein:
said measuring volume (12, 12') has an elongated, especially cylindrical, form and extends along a longitudinal axis (21); and
two photon detecting means (15, 16) are arranged at opposite ends of the measuring volume (12, 12') with respect to the longitudinal axis (21).

25. The radiation detector according to claim 24, wherein:
the measuring volume (12, 12') is bound by a container (11, 11'); and
the photon detecting means (15, 16) are optically coupled to the measuring volume (12, 12') by means of light guides (13, 14), which are preferably coated at their measuring volume sides with a wavelength shifting coating (23).

26. The radiation detector according to claim 25, wherein the inner walls of the container (11, 11') are covered with a photon reflecting coating, especially of PTFE or $MgF_2$ coated Al.

27. The radiation detector according to claim 25, wherein the inner walls of the container (11, 11') are covered with a wavelength shifting coating (22), especially of tetraphenyl butadiene (TPB) and/or P-Terphenyl or a mixture containing one or more of these substances.

28. The radiation detector according to claim 23, wherein the noble gas or noble gas mixture or mixture of noble gases and/or noble gas isotopes in the measuring volume (12, 12') is in the liquid state or in the pressurized gas phase.

29. The radiation detector according to claim 23, wherein the noble gas or noble gas mixture or mixture of noble gases and/or noble gas isotopes in the measuring volume (12, 12') is contained in an inflatable container (11').

30. The radiation detector according to claim 23, wherein the noble gas or noble gas mixture or mixture of noble gases and/or noble gas isotopes in the measuring volume (12, 12') is in contact with an in-situ purification means (52), which is especially based on an impurity-gettering spark gap.

31. The monitoring system according to claim 14, wherein the noble gas or noble gas mixture or mixture of noble gases and/or noble gas isotopes in the measuring volume (12, 12') is in the liquid state or in the pressurized gas phase.

32. The monitoring system according to claim 14, wherein said at least one radiation detector (10") is an airborne device.

33. The method according to one claim 1, wherein the noble gas or noble gas mixture or mixture of noble gases and/or noble gas isotopes used in the measuring volume (12, 12') is in the liquid state or in the pressurized gas phase.

34. The method according to claim 33, wherein the noble gas or noble gas mixture or mixture of noble gases and/or noble gas isotopes used in the measuring volume (12, 12') is purified in-situ.

* * * * *